United States Patent
Yokota et al.

(10) Patent No.: US 7,106,964 B2
(45) Date of Patent: Sep. 12, 2006

(54) LIGHT AMOUNT ADJUSTMENT METHOD FOR USE IN IMAGE EXPOSURE APPARATUS

(75) Inventors: Kenji Yokota, Kanagawa (JP); Katsuto Sumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 189 days.

(21) Appl. No.: 10/937,498

(22) Filed: Sep. 10, 2004

(65) Prior Publication Data
US 2005/0057681 A1    Mar. 17, 2005

(30) Foreign Application Priority Data
Sep. 11, 2003    (JP)    ............................ 2003-319580

(51) Int. Cl.
*G03B 41/00*    (2006.01)
*G03G 5/02*    (2006.01)
*H04N 1/405*    (2006.01)

(52) U.S. Cl. ..................... 396/563; 347/253; 358/3.06; 358/406

(58) Field of Classification Search ................ 396/563; 347/253; 358/406, 504
See application file for complete search history.

(56) References Cited

U.S. PATENT DOCUMENTS 5,835,235 A * 11/1998 Goto et al. ................. 358/406
5,973,719 A * 10/1999 Araki et al. ................ 347/253

FOREIGN PATENT DOCUMENTS

JP    8-23422 A    1/1996

* cited by examiner

*Primary Examiner*—W. B. Perkey
(74) *Attorney, Agent, or Firm*—Sughrue Mion, PLLC

(57) ABSTRACT

A light amount adjustment method for use in an image exposure apparatus records an image by scanning a photosensitive material with a light beam modulated in accordance with image signal. The light beam has a first light amount level and a second light amount level that is higher than the first light amount level to perform exposure of one dot. The method sets the first light amount level based on the image signal, exposes test patches by displacing a focus position of the light beam on the photosensitive material and changing the second light amount level that is outputted in accordance with changing of the image signal and adjusts the second light amount level such that halftone dot percent fluctuations of the exposed test patches are minimized to set the adjusted second light amount level.

3 Claims, 8 Drawing Sheets

LIGHT AMOUNT ADJUSTMENT METHOD FOR USE IN IMAGE EXPOSURE APPARATUS

BACKGROUND OF THE INVENTION

The present invention relates to a light amount adjustment method for use in an image exposure apparatus, in particular, a light amount adjustment method for use in an image exposure apparatus with which image quality is enhanced by suppressing degradation of image quality in the rising and falling portions of a light beam through light amount increase in the edge portions of an image signal.

In recent years, a computer-to-plate (CTP) system has been used widely in which a digital image is created using a computer and image recording is performed directly on a printing plate without using a film at the time of plate making. As an image exposure apparatus used in such a CTP system or the like, an image exposure apparatus is used which records an image as a latent image by performing laser light exposure in accordance with a digital image signal while holding a photosensitive material, such as a PS plate, on the surface of a rotating drum.

With this technique, the turned-on state of a light beam irradiated from a light source for exposure is controlled in accordance with a binary image signal generated based on the image data of an original image to be recorded and a photosensitive material is two-dimensionally scanned with the light beam modulated in accordance with the image signal by relatively moving the light source for exposure and the photosensitive material. In this manner, a desired image is recorded as a latent image on the photosensitive material.

An image for plate making is a halftone dot gradation image (area-modulated image) using so-called halftone dots and each halftone dot is recorded by a collection of many dots formed through scan-exposure using a light beam having a certain size determined in accordance with a resolution.

Conventionally, in such an exposure apparatus, when the quality of a laser beam is degraded, a correction has been made in which image quality is improved by creating an edge signal from the ON/OFF signal for a laser beam and changing a light amount at the instant of laser beam ON/OFF in accordance with the edge signal. The increase of the light amount at the instant of laser beam ON/OFF in accordance with the edge signal created from a laser beam-ON/OFF signal will be referred to as the "edge light amount increase" in this specification.

For instance, a method is proposed with which the brightness of a light source is increased at the time of exposure of a contour portion of an image to be recorded on a photosensitive material and the edge of density is sharpened in the contour portion through edge enhancement based on differentiation of a binary signal (see JP 08-023422 A, for instance).

In the conventional edge light amount increase process, the light amount increment has been determined to a uniformly fixed value with reference to a result of evaluation conducted in advance and the edge light amount increase has been carried out on a fixed percent basis using the value. Therefore, when the sensitivities or the like of photosensitive materials vary from one lot to another or from one kind to another, there occurs a problem in that the light amount correction by the edge light amount increase becomes insufficient or, inversely, excessive.

SUMMARY OF THE INVENTION

The present invention has been made in order to solve the conventional problems described above and has an object to provide a light amount adjustment method for use in an image exposure apparatus with which it becomes possible to set a proper light amount increment for edge light amount increase even on a user side so as to achieve a stabilized image quality improvement effect at all times in defiance of variations in photosensitive material characteristics.

In order to attain the above-described object, the present invention provides a light amount adjustment method for use in an image exposure apparatus that records an image by scanning a photosensitive material with a light beam modulated in accordance with an image signal, the light beam having a first light amount level and a second light amount level that is higher than the first light amount level to perform exposure of one dot, comprising setting the first light amount level based on the image signal, exposing test patches by displacing a focus position of the light beam on the photosensitive material and changing the second light amount level that is outputted in accordance with changing of the image signal, and adjusting the second light amount level such that halftone dot percent fluctuations of the exposed test patches are minimized to set the adjusted second light amount level.

Preferably, the first light amount level is driven in accordance with the image signal, and the second light amount level is driven in accordance with an edge signal of the image signal.

And, preferably, the edge signal of the image signal comprises a signal at one edge of the image signal for performing the exposure of one dot or signals at both edges of the image signal for performing the exposure of one dot.

According to the present invention, by changing the focus position and the second light amount level (edge light amount), respectively, to thereby automatically adjust the second light amount level such that halftone dot percent fluctuations are minimized, a user may adjust an edge light amount increase to a suitable amount, and thus a stabilized image quality improvement effect at all times may be achieved in defiance of variations in photosensitive material characteristics.

This application claims priority on Japanese patent application No. 2003-319580, the entire contents of which are hereby incorporated by reference. In addition, the entire contents of the literature cited in this specification are hereby incorporated by reference.

DETAILED DESCRIPTION OF THE PREFERRED EMBODIMENT

The light amount adjustment method for use in an image exposure apparatus according to the present invention will now be described in detail based on a preferred embodiment illustrated in the accompanying drawings.

In the embodiment, a technique will be described with which it becomes possible to properly set, even on a user side for example, the light amount increment for edge light amount increase (edge light amount) upon so-called "edge light amount increase correction" where image quality improvement is achieved through light amount increase in the rising and falling edge portions of an image signal.

Figure 1:
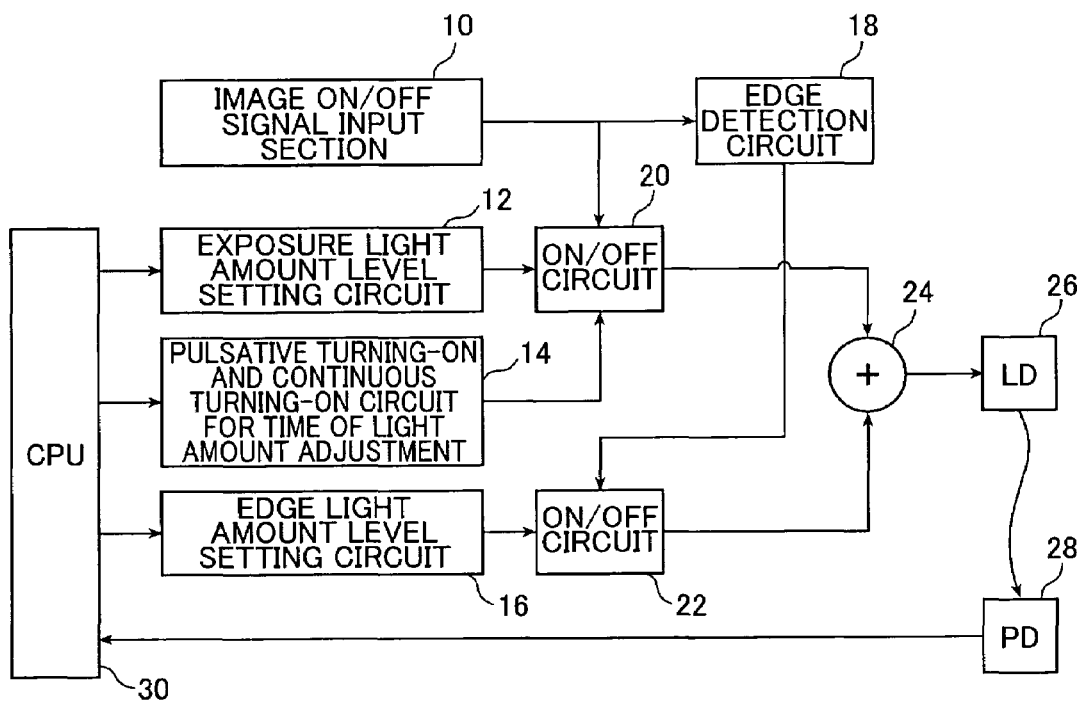
FIG. 1 is a block diagram showing a schematic construction of an image exposure apparatus provided with a circuit that implements an embodiment of the light amount adjustment method according to the present invention.

FIG. 1 is a block diagram showing a schematic construction of an image exposure apparatus provided with a circuit that implements a light amount adjustment method according to an embodiment of the present invention.

As shown in FIG. 1, the image exposure apparatus provided with the circuit that implements the light amount adjustment according to this embodiment includes an image ON/OFF signal input section 10, an exposure light amount level setting circuit 12 that sets an exposure light amount level for image recoding that is a first light amount level, a pulsative turning-on and continuous turning-on circuit for the time of light amount adjustment 14, an edge light amount level setting circuit 16 that sets an edge light amount level that is a light amount increment for edge light amount increase, an edge detection circuit 18 that detects edges that are the rising/falling portions of an image ON/OFF signal, an ON/OFF circuit 20 that performs switching between ON and OFF of an image signal for image recording at the first light amount level, an ON/OFF circuit 22 that performs switching of recording at a second light amount level in the edge portions, an adder 24 that creates the second light amount level for the recording in the edge portions by adding the light amount increment for edge light amount increase to the first light amount level, a laser diode (hereinafter abbreviated as the "LD") 26 that emits a light beam, a power detector (hereinafter abbreviated as the "PD") 28 that detects the light emission from the LD 26, and a CPU 30 that receives a detection signal from the PD 28 as feedback and performs overall control of the circuit. The LD 26 is modulated in accordance with the image signal and controlled such that the light beam is emitted or not.

Figure 2A:
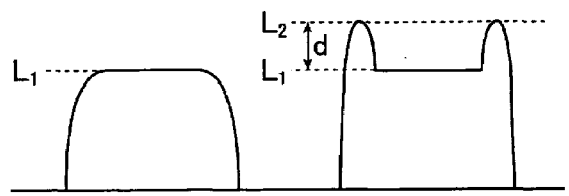
FIGS. 2A to 2C are each a diagram showing an example of a signal waveform at the time of image exposure, with FIG. 2A showing a light amount waveform for the image exposure, FIG. 2B showing an image ON signal, and FIG. 2C showing an edge signal.
Figure 2B:
Figure 2C:

Examples of signal waveforms at the time of image exposure by the image exposure apparatus shown in FIG. 1 are shown in FIGS. 2A to 2C. Here, FIG. 2A shows a light amount waveform for actual image exposure, FIG. 2B shows an image ON signal showing an image exposure state, and FIG. 2C shows an edge signal showing timings at which the edge light amount increase correction should be made.

When the image ON signal shown in FIG. 2B is inputted from the image ON/OFF signal input section 10 into the ON/OFF circuit 20, the light amount waveform shown on the left side in FIG. 2A, which has the first light amount level $L_1$ set by the exposure light amount level setting circuit 12, is outputted from the exposure light amount level setting circuit 12 to the adder 24 through the ON/OFF circuit 20.

When the edge light amount increase correction is not performed, the light amount waveform shown on the left side in FIG. 2A passes through the adder 24 as it is and is inputted into the LD 26, leading to image exposure at the first light amount level $L_1$. When the edge light amount increase correction is not performed like in this case, waveform rounding which occurs in the rising and falling portions of the image signal as indicated by the waveform shown on the left side in FIG. 2A will induce image quality degradation.

Therefore, in order to achieve image quality improvement, the edge light amount increase correction is made. In this case, the edge signal shown in FIG. 2C is detected by the edge detection circuit 18 from the image ON signal and is inputted into the ON/OFF circuit 22. Then, the light amount increment for edge light amount increase (edge light amount) set by the edge light amount level setting circuit 16 is inputted into the adder 24 through the ON/OFF circuit 22 in accordance with the edge signal.

Following this, in the adder 24, the edge light amount d is added to the first light amount level $L_1$ set by the exposure light amount level setting circuit 12 and inputted into the adder 24 through the ON/OFF circuit 20. Consequently, the light amount waveform shown on the right side in FIG. 2A is obtained in which the second light amount level $L_2$ that is higher than the first light amount level $L_1$ is set only in the edge portions of the image signal. This light amount waveform is outputted to the LD 26, leading to image exposure with a light beam whose light amount has been changed in the edge portions. In this manner, image quality degradation is suppressed.

In this embodiment, a method is provided with which it becomes possible to make a proper setting of the light amount increment (edge light amount) d upon the edge light amount increase correction as above even on a user side for example, through automatic setting.

Next, a method of determining (adjusting) the edge light amount d that is the light amount increment for edge light amount increase will be described.

Figure 3:
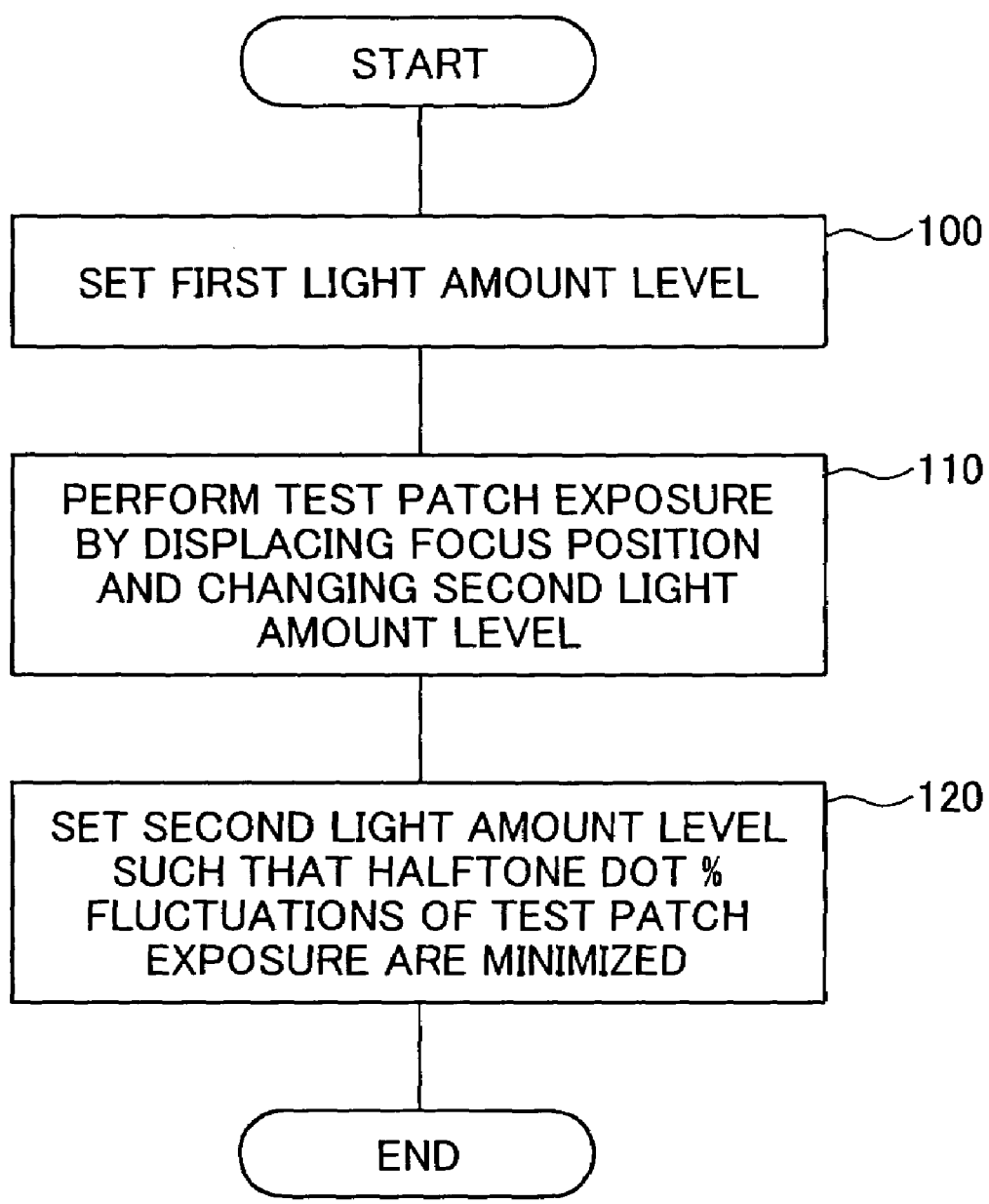
FIG. 3 is a flowchart showing an example of a flow of the light amount adjustment method according to the embodiment.

FIG. 3 is a flowchart showing an example of a flow of the edge light amount determination method.

The edge light amount determination method will be described below by following the flowchart.

Referring to FIG. 3, first in step 100, prior to determination of the edge light amount, the exposure light amount that is the first light amount level is determined, which is an average light amount in the case where the edge light amount increase correction is not made or a light amount at the time of solid exposure.

In this determination of the exposure light amount, light amount adjustment is performed through pulsative turning-on or continuous turning-on of the LD 26 using the pulsative turning-on and continuous turning-on circuit for the time of light amount adjustment 14. In detail, for instance, a solid patch exposure is performed, a result of this exposure is observed after development, and a proper light amount is determined. Here, for instance, the proper light amount is set to a light amount that is 1.2 times a light amount with which an exposure result exhibiting a clarity favorable for an operator is obtained after development.

Next, in step 110, in order to determine the edge light amount d, test patch exposure is performed while displacing a focus position (focusing position) and changing the second light amount level that is an exposure light amount in the edge portions.

Here, two methods are conceivable for the test patch exposure. With a first method, the focus position is first fixed and the second light amount level is changed with respect to the focus position. With a second method, the second light amount level is first fixed and the focus position is displaced with respect to the second light amount level.

Figure 4:
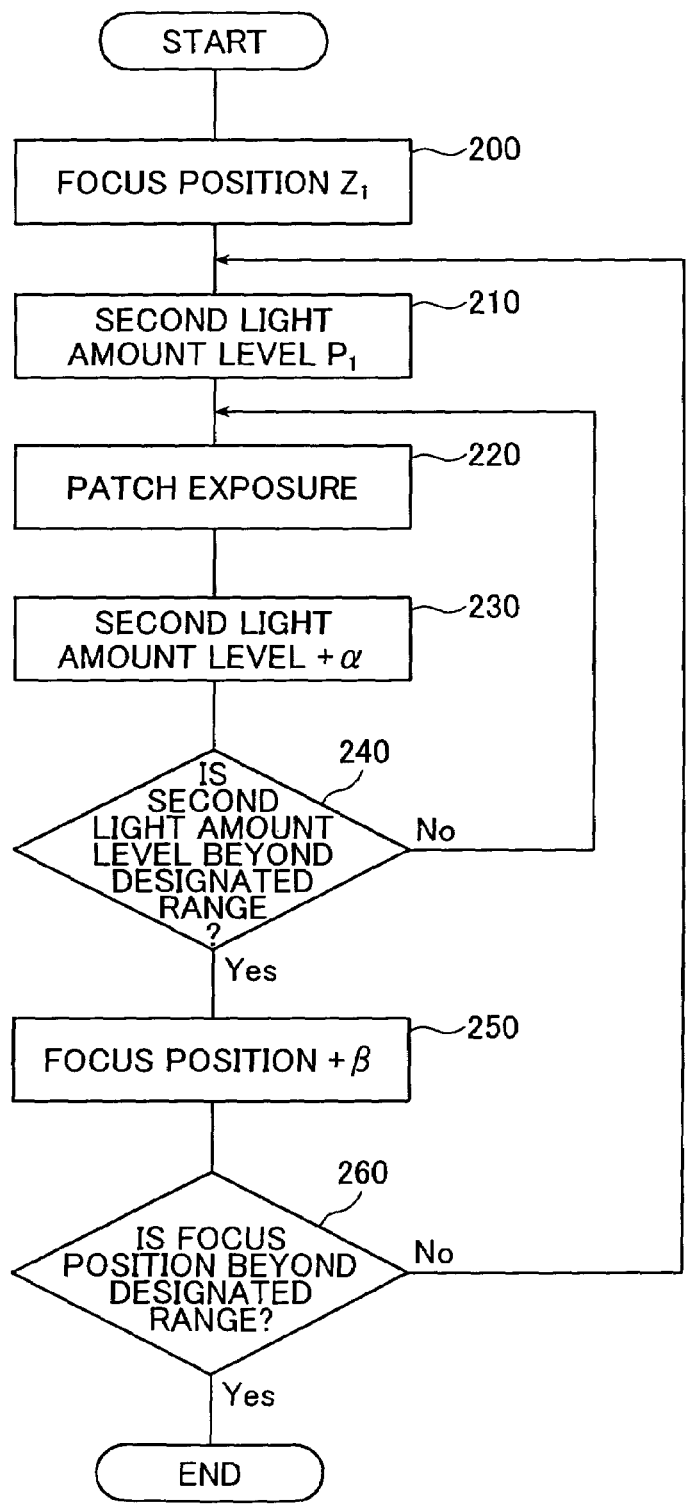
FIG. 4 is a flowchart showing an example of a flow of a first method for test patch exposure in the embodiment.

First, the first method for the test patch exposure will be described. FIG. 4 is a flowchart showing an example of a flow of the first test patch exposure method.

Referring to FIG. 4, first in step 200, the focus position is fixed to the minimum position $z_1$ (for instance, "$z_1=-40$ μm" where an in-focus position is set to 0 μm).

Next, in step 210, the second light amount level is set to $P_1$ (for instance, "$P_1=P_0$" where "$P_0$" is the exposure light amount that is the first light amount level).

Next, in step 220, patch exposure is performed under this condition.

Next, in step 230, the second light amount level of $P_1$ is increased by $\alpha$ and a new second light amount level $P_2$ expressed by an equation "$P_2=P_1+\alpha$ ($=P_0+\alpha$)" is obtained. Here, the increasing quantity $\alpha$ of the second light amount level is not specifically limited and is, for instance, set to 0.1 times the exposure light amount $P_0$, i.e., "$\alpha=0.1 \times P_0$". In this case, the value $P_2$ becomes as expressed by an equation "$P_2=P_1+0.1 \times P_0=1.1 \times P_0$".

Next, in step 240, it is judged whether the second light amount level is beyond a light amount level range designated in advance. For instance, it is judged whether the second light amount level reaches a value $P_n$ expressed by an equation "$P_n=P_0+(n-1) \times \alpha$".

If it is found as a result of this judgment that the second light amount level is not yet beyond the designated light amount level range, the processing returns to step 220 and the patch exposure is performed again at the second light amount level increased by $\alpha$ ($=0.1 \times P_0$) in step 230 while maintaining the focus position set in step 200.

Through these operations, the patch exposure is repeatedly performed until the second light amount level is beyond the light amount level range designated in advance.

If it is judged in step 240 that the second light amount level is beyond the designated light amount level range, the processing proceeds to the next step 250, in which the focus position is then changed. For instance, the focus position $z_1$ set in step 200 is displaced by $\beta$ and a new focus position $z_2$ expressed by an equation "$z_2=z_1+\beta$" is obtained. The focus position displacement amount $\beta$ is not specifically limited and is, for instance, set as "$\beta=20$ μm". In this case, when "$z_1=-40$ μm", the value $z_2$ becomes as expressed by an equation "$z_2=z_1+\beta=-40$ μm$+20$ μm$=-20$ μm".

Next, in step 260, it is judged whether the focus position is beyond a range designated in advance. For instance, it is judged whether the focus position reaches the maximum value $z_m$ of the focus position expressed by an equation "$z_m=z_1+(m-1) \times \beta$".

If it is found as a result of this judgment that the focus position is not yet beyond the designated range, the processing returns to step 210 and the patch exposure is repeatedly performed again by changing the second light amount level in the same manner as above while maintaining the focus position set in step 250.

Then, if it is judged in step 260 that the focus position is beyond the designated range, the present processing is ended.

Figure 5:
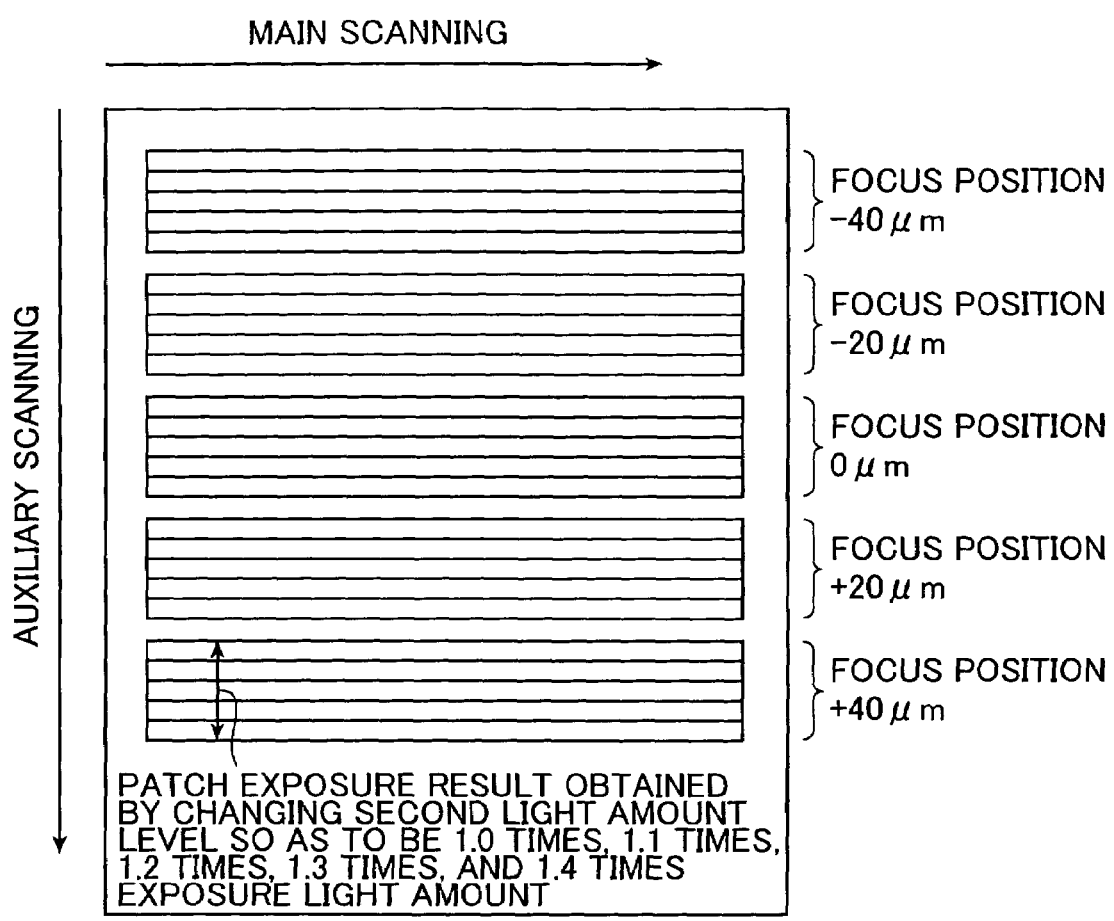
FIG. 5 is an explanatory diagram showing an example of a result of the test patch exposure performed with the first method.

An example of a result of the test patch exposure performed in this manner is shown in FIG. 5.

The result shown in FIG. 5 is obtained by displacing the focus position set to the in-focus position of 0 μm by $\pm 20$ μm and $\pm 40$ μm and changing the second light amount level with respect to each focus position among five values 1.0 times, 1.1 times, 1.2 times, 1.3 times, and 1.4 times as large as that of the first light amount level (exposure light amount).

Figure 6:
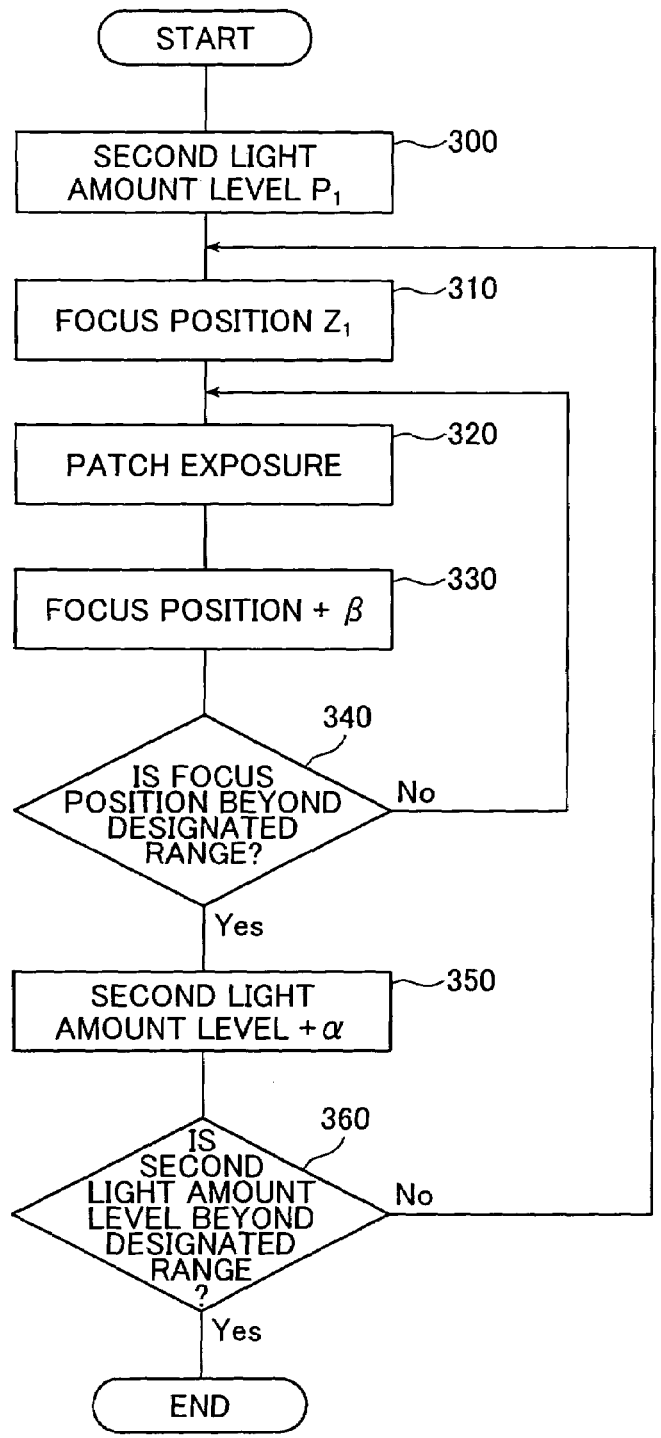
FIG. 6 is a flowchart showing an example of a flow of a second method for test patch exposure in the embodiment.

Next, the second method for the test patch exposure will be described. FIG. 6 is a flowchart showing an example of a flow of the second test patch exposure method.

Referring to FIG. 6, first in step 300, the second light amount level $P_1$ is fixed to the minimum light amount which is, for instance, 1.0 times the first light amount level (exposure light amount) $P_0$. That is, the second light amount level is set as "$P_1=P_0$".

Next, in step 310, the focus position $z_1$ is set to the minimum position. For instance, the focus position is set as "$z_1=-40$ μm" where the in-focus position is set to 0 μm.

Next, in step 320, patch exposure is performed under this condition.

Next, in step 330, the focus position is displaced by $\beta$ and a new focus position $z_2$ expressed by an equation "$z_2=z_1+\beta$" is obtained. Here, the focus position displacement amount $\beta$ is not specifically limited and is, for instance, set to 20 μm. In this case, the value $z_2$ becomes as expressed by an equation "$z_2=z_1+\beta=-40$ μm$+20$ μm$=-20$ μm".

Next, in step 340, it is judged whether the focus position is beyond a focus position range designated in advance. For instance, it is judged whether the focus position reaches the maximum position "$z_m=z_1+(m-1) \times \beta$". If it is found as a result of this judgment that the focus position is not yet beyond the designated focus position range, the processing returns to step 320 and the patch exposure is performed again at the focus position increased by $\beta(=20$ μm$)$ in step 330 while maintaining the second light amount level set in step 300.

Through these operations, the patch exposure is repeatedly performed until the focus position is beyond the range designated in advance.

If it is judged in step 340 that the focus position is beyond the designated focus position range, the processing proceeds to the next step 350, in which the second light amount level is then changed. For instance, the second light amount level $P_1$ is increased by $\alpha$ and a new second light amount level $P_2$ expressed by an equation "$P_2=P_1+\alpha$" is obtained. The light amount level increasing quantity $\alpha$ is not specifically limited and is, for instance, set to 0.1 times the first light amount level (exposure light amount), i.e., set as "$\alpha=0.1 \times P_0$". In this case, the value $P_2$ becomes as expressed by an equation "$P_2=P_1+0.1 \times P_0=P_0+0.1 \times P_0=1.1 \times P_0$".

Next, in step 360, it is judged whether the second light amount level is beyond a range designated in advance. For instance, it is judged whether the second light amount level reaches the maximum value $P_n$ of the second light amount level expressed by an equation "$P_n=P_0+(n-1) \times \alpha$".

If it is found as a result of this judgment that the second light amount level is not yet beyond the designated range, the processing returns to step 310 and the patch exposure is repeatedly performed again by displacing the focus position in the same manner as above while maintaining the second light amount level set in step 350.

Then, if it is judged in step 360 that the second light amount level is beyond the designated range, the present processing is ended.

Figure 7:
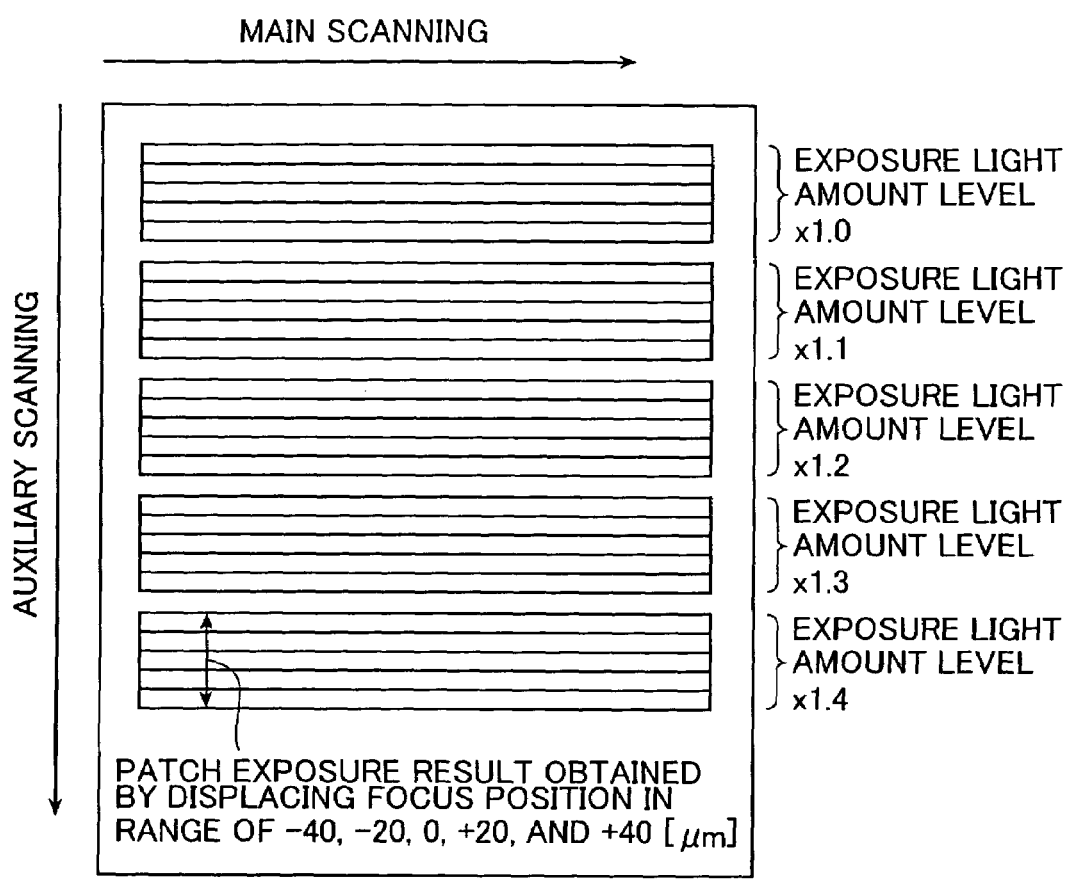
FIG. 7 is an explanatory diagram showing an example of a result of the test patch exposure performed with the second method.

An example of a result of the test patch exposure performed in this manner is shown in FIG. 7.

The result shown in FIG. 7 is obtained through patch exposure performed by changing the second light amount level among five values 1.0 times, 1.1 times, 1.2 times, 1.3 times, and 1.4 times as large as that of the first light amount level (exposure light amount) and displacing the focus position set to the in-focus position of 0 μm by ±20 μm and ±40 μm with respect to each second light amount level.

An example of a test pattern that is actually used in the test patch exposure performed with either of the two methods described above is shown in FIG. 8.

Figure 8:
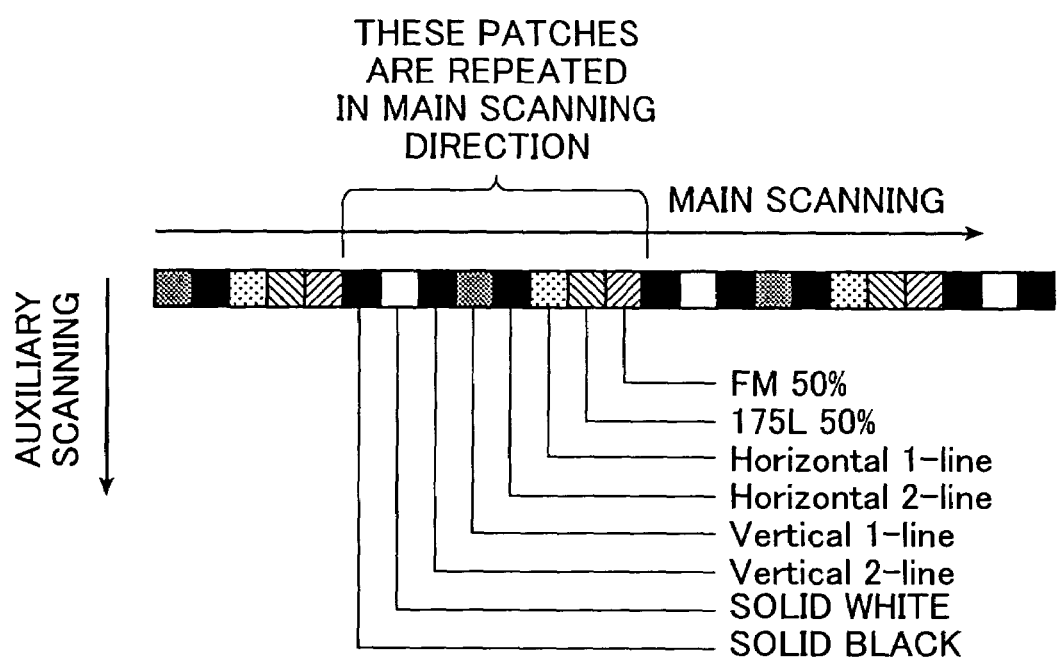
FIG. 8 is an explanatory diagram showing an example of a test pattern used in the test patch exposure in the embodiment.

Each line in a main scanning direction of the test patch exposure results shown in FIGS. 5 and 7 described above is formed through repetition in the main scanning direction of patches shown in FIG. 8: a solid black patch, a solid white patch, a vertical 2-line patch, a vertical 1-line patch, a horizontal 2-line patch, a horizontal 1-line patch, a 175L 50% patch, and a FM 50% patch. Here, the vertical 1-line patch means a patch where ON/OFF is repeated in units of one line in a vertical direction, while the horizontal 1-line patch means a patch where ON/OFF is repeated in units of one line in a horizontal direction.

Referring again to the flowchart shown in FIG. 3, in step 120, the test patch exposure result obtained in the manner described above is measured and a second light amount level setting is made such that halftone dot percent fluctuations are minimized.

In more detail, the halftone dot % $S(=S(P_i, z_j))$ of each patch with respect to each second light amount level $P_1$, $P_2, \ldots, P_n$ and each focus position $z_1, z_2, \ldots, z_m$ is measured.

Then, the halftone dot % fluctuation margin with respect to each second light amount level $P_i$, which is defined as "max $\{S(P_i, z_1), S(P_i, z_2), \ldots, S(P_i, z_m)\}$−min $\{S(P_i, z_1), S(P_i, z_2), \ldots, S(P_i, z_m)\}$" (Expression (1)), is calculated.

The second light amount level $P_i$ which provides the minimum value, that is, the closest value to "0", of the halftone dot % fluctuation calculated with Expression (1) for each second light amount level $P_i$ is determined as a set light amount.

Also, a difference between the second light amount level $P_i$ determined as the set light amount and the first light amount level $P_0$ becomes the edge light amount d shown in FIG. 2. The edge light amount level setting circuit 16 sets this difference as the edge light amount that should be added to the first light amount level.

It should be noted here that the halftone dot % fluctuations are measured in this embodiment, although the present invention is not limited to this and the density of each patch may be measured instead.

Figure 9:
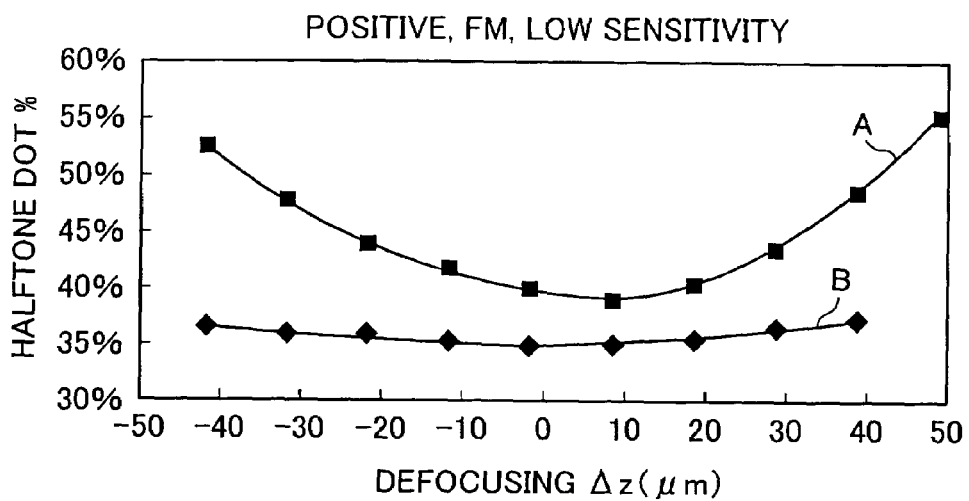
FIG. 9 is a diagram showing examples of a relationship between defocus characteristics and halftone dot % fluctuations and illustrating an effect of the present invention.

FIG. 9 shows examples of a relationship between defocus characteristics and halftone dot %. In this drawing, graph A relates to a case of a conventional system and it can be seen from this graph that the halftone dot % greatly fluctuates with respect to defocusing. In contrast to this, graph B relates to a case of this embodiment where the edge light amount increase correction is made, and it can be seen from this graph that the halftone dot % fluctuations are suppressed to a very small level.

Figure 10:
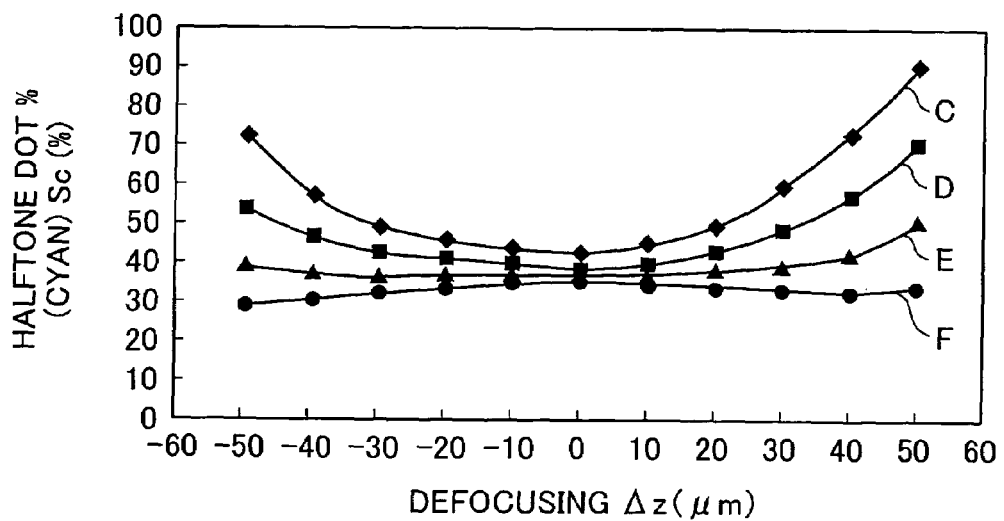
FIG. 10 is a diagram showing examples of the relationship between the defocus characteristics and the halftone dot % fluctuations where a second light amount level in the embodiment is changed.

Also, FIG. 10 shows examples of the relationship between the defocus characteristics and the halftone dot % in the case where the edge light amount (second light amount level) in the embodiment is changed in various ways. In FIG. 10, graph C relates to a case where the second light amount level is set to 1.2 times the exposure light amount, graph D relates to a case where the second light amount level is set to 1.4 times the exposure light amount, graph E relates to a case where the second light amount level is set to 1.7 times the exposure light amount, and graph F relates to a case where the second light amount level is set to 2.2 times the exposure light amount. It can be seen from FIG. 10 that if the second light amount level is set to around 1.7 times or more the exposure light amount, it becomes possible to considerably suppress the halftone dot % fluctuations.

As described above, according to the embodiment of the present invention, the light amount adjustment is performed by displacing the focus position and changing the second light amount level (edge light amount) such that the halftone dot % fluctuations are minimized. As a result, it becomes possible to obtain a stabilized image quality improvement effect at all times in defiance of variations in photosensitive material characteristics. Also, the setting of the second light amount level is automatically made in such a manner described above that the halftone dot % fluctuations are minimized, which makes it possible to make a proper setting of the edge light amount increase correction even on a user side.

Further, the correction is made in accordance with photosensitive material characteristics, so that it becomes possible to achieve image quality improvement without causing excessive correction. As a result, it becomes possible to elongate the life span of the LD and to suppress rising of the temperature of the LD, which means that the present invention also provides an environmentally friendly effect.

The light amount adjustment method for use in an image exposure apparatus according to the present invention has been described in detail above based on the embodiment, although the present invention is not limited to the embodiment and it is of course possible to make various modifications and changes without departing from the gist of the present invention.

What is claimed is:

1. A light amount adjustment method for use in an image exposure apparatus that records an image by scanning a photosensitive material with a light beam modulated in accordance with an image signal, said light beam having a first light amount level and a second light amount level that is higher than the first light amount level to perform exposure of one dot, comprising:

setting said first light amount level based on said image signal;

exposing test patches by displacing a focus position of the light beam on the photosensitive material and changing said second light amount level that is outputted in accordance with changing of said image signal; and adjusting said second light amount level such that halftone dot percent fluctuations of the exposed test patches are minimized to set said adjusted second light amount level.

2. The light amount adjustment method according to claim 1, wherein said first light amount level is driven in accordance with said image signal, and said second light amount level is driven in accordance with an edge signal of said image signal.

3. The light amount adjustment method according to claim 2, wherein said edge signal of said image signal comprises a signal at one edge of said image signal for performing the exposure of one dot or signals at both edges of said image signal for performing the exposure of one dot.

* * * * *